United States Patent
Schaefer et al.

(10) Patent No.: US 6,822,953 B1
(45) Date of Patent: Nov. 23, 2004

(54) METHOD FOR TRANSMITTING RADIO SIGNALS AND RECEIVER FOR RECEIVING RADIO SIGNALS

(75) Inventors: Wolfgang Schaefer, Hildesheim (DE); Frank Hofmann, Hildesheim (DE); Christian Hansen, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 697 days.

(21) Appl. No.: 09/590,399

(22) Filed: Jun. 8, 2000

(30) Foreign Application Priority Data

Jun. 8, 1999 (DE) .......................................... 199 25 925

(51) Int. Cl.$^7$ .............................................. H04B 7/208
(52) U.S. Cl. ........................ 370/344; 370/208; 370/252
(58) Field of Search ................................ 370/206, 330, 370/208, 316, 203, 210, 430, 295, 343, 344, 252; 375/260, 216, 347, 299, 344, 269; 455/108, 449, 324, 456; 714/776, 755, 752; 348/478

(56) References Cited

U.S. PATENT DOCUMENTS

| | | | | |
|---|---|---|---|---|
| 5,784,418 A | * | 7/1998 | Sykes et al. | 375/347 |
| 6,128,334 A | * | 10/2000 | Drapper et al. | 375/216 |
| 6,175,550 B1 | * | 1/2001 | Van Nee | 370/206 |
| 6,430,227 B1 | * | 8/2002 | Kroeger et al. | 375/260 |

FOREIGN PATENT DOCUMENTS

| | | |
|---|---|---|
| DE | 197 43 167 | 4/1999 |
| DE | 197 43 645 | 4/1999 |
| EP | 1 050 984 | 11/2000 |

OTHER PUBLICATIONS

P. Bureau, "Compatible Digital Broadcasting For AM Radio Bands," IBE, pp. 53–54 (Mar. 1999).

ETSI Standard EN 50 067, "Specification of the Radio Data System (RDS) for VHF/FM Sound Broadcasting in the Frequency Range From 87.5 to 108.0 MHz," (1990).

* cited by examiner

*Primary Examiner*—John Pezzlo
(74) *Attorney, Agent, or Firm*—Kenyon & Kenyon (57) ABSTRACT

A method for transmitting radio signals and a receiver for receiving radio signals are described which are used to present a radio station which is transmitted on multiple frequencies with the data on the frequency that has the best signal quality. Via received radio signals the receiver is provided a list of all the frequencies on which radio stations are transmitted, the receiver checking each frequency to determine whether the frequency belongs to the radio station selected by the user and whether the signal quality is better than that which is used for the presentation of the radio station. Test symbols having pilots and useful data signals are used to determine the signal quality. An identification number for the radio station is determined from the useful data signals of the test symbols before the signal quality is checked and a channel estimate is made via the pilots. The test symbols are modulated with coherent QPSK. A test symbol is recognized in the data flow by a different protective interval.

17 Claims, 5 Drawing Sheets

METHOD FOR TRANSMITTING RADIO SIGNALS AND RECEIVER FOR RECEIVING RADIO SIGNALS

FIELD OF THE INVENTION

The present invention relates to a method for transmitting radio signals and to a receiver for receiving radio signals.

BACKGROUND INFORMATION

In P. Bureau: "Compatible digital broadcasting for AM radio bands," IBE, March 1999, pages 53 to 54, a digital transmission method based on OFDM is to be used in the short wave, medium wave and long wave range. It is planned to design this "Digital Radio Mondiale" system (DRM) to be compatible with the radio frequency pattern of the analog short, medium and long wave transmission methods. In so doing, the capability of broadcasting a radio station on several frequencies will be preserved.

With FM/RDS according to ETSI Standard EN 50067 entitled "Specification of the Radio Data System (RDS) for VHF/FM sound broadcasting in the frequency range from 87.5 to 108.0 MHz," the switch is made to an alternative frequency for a radio station, the identification number of the particular radio station contained in the RDS signal being analyzed after the frequency change.

SUMMARY OF THE INVENTION

In contrast, the method and the receiver according to the present invention have an advantage in that the receiver for a radio station selected by the user searches for the transmitter having the best signal quality. The search is screened off from the user so that only the name, for example, of the radio station in question is indicated to the user.

Since the transmitter with the best reception quality is sought, the best reception quality is always made available for the user. Moreover, it is an advantage that the radio station is recognized by the receiver via an identification number which the receiver determines from the radio signals. This ensures an unambiguous assignment of the received radio station by the receiver.

It is advantageous that a change of carrier signal is made without interruption for a radio station that is transmitted on more than one transmission frequency. A user who, for example, is listening to music will not notice any interruption in the music broadcast. This change is advantageously made when the signal quality on the new carrier signal is better than on the previous one. For this purpose, it is advantageous that the determination of the identification number and the determination of the signal quality of the particular radio station is made before the actual change of transmission frequency to ensure that the identical station is being transmitted on this frequency and not that of another broadcasting station. This makes uninterrupted reception of the radio station possible when a carrier signal is switched.

One embodiment according to the present invention provides that the data concerning the carrier signals, the transmission frequencies, in particular, on which the same radio station is broadcast are determined from the radio signals by the receiver so that the receiver for a radio station selected by the user checks these various carrier signals for their signal quality and selects the carrier signal on which the radio station selected by the user is received with the best signal quality.

To provide the receiver time for an uninterrupted check of the other transmission frequencies available, test symbols are provided, from which the receiver determines the identification number of the particular radio station. For these test symbols, a coherent digital modulation method is used, for example, quadrature phase shift keying. This method is distinguished by a high level of interference immunity.

In addition, it is advantageous that by an appropriate modification of the symbol duration of the test symbol without determination of the identification number via correlation methods, it is ensured that the radio station is the same one that the user selected because the different broadcasting stations do not synchronize their broadcasts.

Moreover, it is an advantage that the reference phase and the reference amplitude are determined in a simple manner via pilot carriers for the coherent demodulation of a digital modulation method, for example, QPSK.

The use of a digital modulation method makes it advantageously possible to determine the signal quality via the deviation of the amplitude and the phase of the received radio signal from the expected amplitude and phase. A suitable evaluation of all deviations, such as, for example, the average value, that occur for a test symbol, is taken as a measure of the signal quality.

Another embodiment according to the present invention provides that the test symbols are recognized by a correlation with the protective interval of the test symbols. In doing so, the characteristic of the OFDM symbols, that the protective interval is a copy of the symbol end and is simultaneously a periodic continuation of the symbol, is utilized.

Yet another embodiment according to the present invention provides that state information, such as, for example, frequency and amplification settings, is stored in the receiver for the carrier signal being used at the moment so that the receiver easily returns to the originally used carrier signal with the same settings after having checked the signal quality on the alternative carrier signals.

Moreover, it is an advantage that the symbol pulse setting of the data flow which was determined for the presentation of the radio station selected by the user is also used for the symbol pulse on the alternative frequencies.

One embodiment according to the present invention provides that state information concerning the receiver, such as, for example, amplification and frequency settings, is stored in the receiver for a successfully checked carrier signal on an alternative frequency so that the receiver can start with improved start values for reception in a later check or a continuous change.

In addition, it is an advantage that the receiver according to the present invention makes it possible for only one receive section to be required for the monitoring of the alternative carrier signals. Therefore, the present invention provides a simple and improved product.

DETAILED DESCRIPTION

Figure 1:
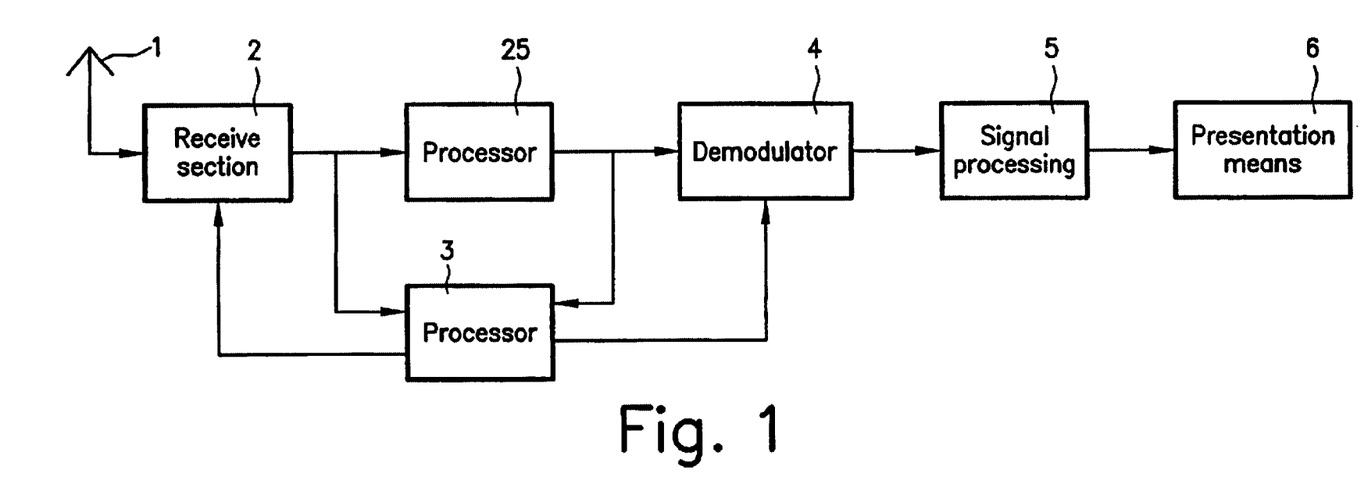
FIG. 1 shows a block diagram of a receiver according to the present invention.

FIG. 1 shows a diagrammatic representation of the configuration of a receiver via a block diagram. An antenna 1 is connected to a receive section 2. The radio signals are received with antenna 1 and are then sent to receive section 2. In receive section 2, the received radio signals are filtered, amplified, converted into an intermediate frequency and digitized. The filtering occurs based on the radio station selected by the user, receive section 2 interpreting the radio station as a reception frequency. The settings in receive section 2 for a received radio station are each stored to start later with non-random values for these settings. Such settings relate to, for example, the receive filter, the signal amplification, the frequency synchronization and the skew of some signals in relation to the data flow.

Receive section 2 is connected via a data input and a data output to a processor 3. Via this data input, receive section 2 receives from processor 3 the data which contains the frequencies that must be filtered out of the received radio signals.

A processor 25 is also connected via the data output of receive section 2, the processor carrying out a Fast Fourier Transformation (FFT). FFT is a method for transforming a time signal into the frequency range. This transformation into the frequency range is useful to then implement a frequency synchronization and the demodulation of the data signals modulated onto the subcarriers of the orthogonal frequency division multiplex. The result of FFT is transferred to processor 3 and to a demodulator 4.

Processor 3 is also connected to demodulator 4. Processor 3 transfers to demodulator 4 data regarding the time synchronization, for example, the start of a frame and the start of a symbol.

The demodulated signals are passed from demodulator 4 to signal processing 5. In signal processing 5, the demodulated signals are further processed so that they can be presented by a presentation means 6. Presentation means 6 is typically a loudspeaker but a monitor is also possible.

Here, radio signals are transmitted in the orthogonal frequency division multiplex (OFDM), the total frequency range used corresponding to short, medium and long wave. The data to be transmitted is distributed to multiple subcarriers, the radio signals distributed to the subcarriers not interfering with each other. Therefore, when a radio station is received, the frequency range to which the radio signals of a radio station are distributed must be filtered out.

The orthogonal frequency division multiplex is suited, in particular, for radio systems since this method is designed for radio signals that undergo multipath propagation. This applies, in particular, when a radio-frequency channel has frequency-dependent attenuation. It is therefore useful if the signal is not transmitted in only one frequency and is subject to a very high attenuation in the worst case scenario while the signal would be attenuated much less on other frequencies. If the signal is distributed over a greater frequency range, the probability is slight that the total signal will be subjected to a strong attenuation due to the frequency-selective signal fade.

The radio wave propagation characteristics in short, medium and long wave result in multipath propagation. Because of buildings, the landscape and primarily atmospheric strata, the radio signals are reflected and scattered due to these circumstances, resulting in multiple paths for the radio signal to take from a transmitter to a receiver. This phenomenon is described as multipath propagation and its result is that different parts of the radio signals of a transmitter arrive at the receiver with varying delay times so that the radio signals of the transmitter overlap at the receiver, thus resulting in inter-symbol interference.

Moreover, the radio signals are attenuated differently as a function of the distance that they cover from a transmitter to a receiver. The attenuation and the delay times determine the transmission characteristics of a radio-frequency channel.

A signal is received at the receiver which is influenced simultaneously by all of these effects, the amplitude and phase relationship of the received signal containing the totality of these interferences. An object of channel equalization is to compensate the transmission characteristics of the radio-frequency channel in conjunction with the channel encoding. In channel encoding, redundant data are added to the useful data to be able to restore destroyed data in the receiver using this redundancy.

To determine the transmission characteristics of a radio-frequency channel, pilot carriers are added to the OFDM radio signals. These pilot carriers are stored in the receiver in their original form. A comparison of received and stored pilots in the receiver determines the transmission characteristics of the radio-frequency channel in the customary manner, for example, in the DVB-T (Digital Video Broadcasting Terrestrial).

Mathematically and practically, this is implemented using a customary correlation method. The result of the correlation provides the channel estimate with the complete transmission characteristics.

Correlation is a technique in which the received signal and the stored original signal are entered into a correlation unit as input data. A signal is obtained at the output of the correlation unit that reflects the changes which the received signal has undergone as a function of the transmission characteristics of the radio-frequency channel. The peak value of the result of correlation increases with improved correspondence of the input signals. For that reason, correlation methods are also used here for synchronization.

The transmission characteristics of a radio-frequency channel are compensated in the receiver so that the receiver is capable of detecting the data originally transmitted. This process is called equalization.

FFT is normally used as a basis for the demodulation of an OFDM multi-carrier signal. To avoid inter-symbol interferences, the actual useful symbol is still preceded by a protective interval which is simply a copy of the symbol end. The length of the protective interval is normally based on the maximum expected echo transmission time in the transmission channel. For the present invention, however, it may be used to adjust the required length of the test symbol.

An object of the time synchronization is first to position the window for the FFT, i.e., to determine the time interval from which the scan values for the FFT are taken. Due to the periodic continuation of the symbol in the protective interval, the object can be achieved, for example, with the aid of correlation.

Figure 2:
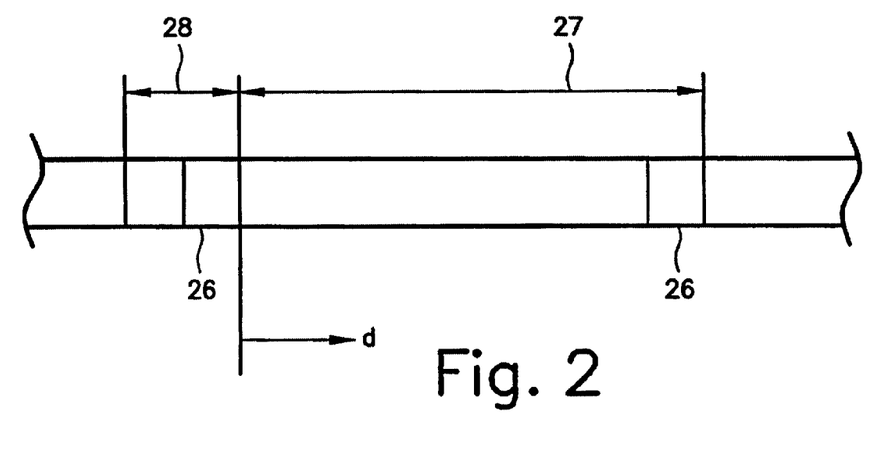
FIG. 2 shows a diagram for determining the time correlation according to the present invention.

FIG. 2 shows the diagram for calculating the time correlation. A test symbol of time span 27 is embedded in the data flow. A protective interval 28 precedes the test symbol. At the end of the test symbol and at the end of protective interval 28 is length $N_P$ 26 which corresponds to the length of the correlation window.

FIG. 2 illustrates the procedure for the time synchronization for the FFT window. The algorithm for detecting the optimum position for the FFT window for the demodulation can be described as follows:

1. Calculation of a correlation between the correlation window of length $N_P$ 26 and the test symbol according to the following formula before implementing FFT.

$$KKF(d) = \sum_{i=0}^{N_P-1} r^*(d+i)r(d+i+N_{PD})$$

r identifies the time signal of the test symbol. $N_{PD}$ 27 indicates the distance between two periodic structures and is here synonymous with the length of FFT $N_{FFT}$. The length of a periodic structure is identified as $N_P$ 26. The start of the test symbol is identified as d.

2. The correlation between the correlation window and the test symbol is calculated for all possible positions d within the observation period.

3. The value for d, for which the correlation expression becomes a maximum, indicates the optimum position of the FFT window for the demodulation.

Protective interval 28 must be dimensioned in such a way that a correlation relationship is preserved between time segment $N_P$ 26 of protective interval 28 and time segment $N_P$ 26 at the end of the test symbol even in the case of channel echo. The duration of the correlation window $T_{korr}$ results from the product of $N_P$ 26 and the duration of a scan value. Protective interval 28 is subdivided to a certain extent into a range which is needed for compensation of intersymbol interference and into an additional range which is used as a training window for detecting the correct position of the FFT window.

Since the useful information in the test symbol can be used repeatedly for a plurality of times depending on the needed total duration, multiple maximum correlations occur only with slight propagation time differences. However, this represents no problem for the receiver since it can randomly set the FFT window to one of the determined times, thus normally the first one. In the actual act of switching to a different frequency, it must only be taken into account that the further data flow only occurs immediately after the latest maximum.

Processor 3 takes over such synchronization tasks; it performs the aforementioned channel estimate and accordingly equalizes the received signals.

After an initialization phase or via a preset, the user will select a radio station. The initialization phase means that the radio receiver first determines a list of the receivable radio stations and their transmission frequencies from the received radio signals. The radio signals have such data for this purpose. As an alternative the manufacturer of the radio receivers can already provide a list of the transmission frequencies for the radio stations. The user will therefore enter only the name of the desired station.

A carrier signal corresponding to a transmission frequency is assigned to the radio station selected by the user. Processor 3 transfers the necessary frequency information from the list to receive section 2 so that receive section 2 filters out the corresponding frequency from the received radio signals. From the received radio signals that are received on this frequency, processor 3 determines the identification number after synchronization is completed to determine whether the radio station selected by the user is present. Concurrent with the demodulation of the identification number, processor 3 determines the signal quality.

Demodulator 4 determines this signal quality via test symbols and the method described below. These test symbols are modulated with coherent quadrature phase shift keying. However, other coherent digital modulation methods may also be used.

Figure 3:
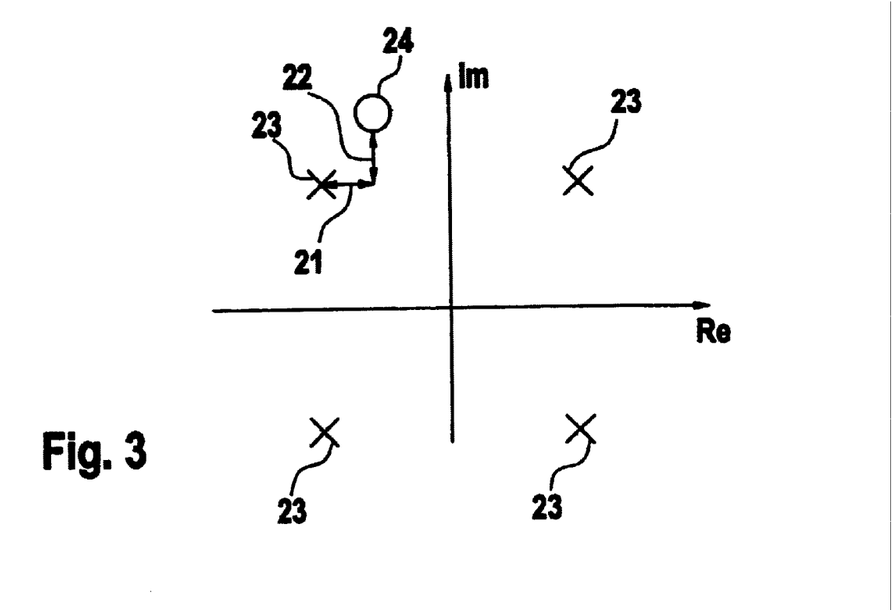
FIG. 3 shows a constellation diagram with phase shift keying according to the present invention.

Quadrature phase shift keying (QPSK) is a digital modulation in which the phase of the signal is modulated. FIG. 3 shows a constellation diagram with QPSK. The received signals are plotted in complex representation in this diagram. Therefore, the real part is to be read on the abscissa and the imaginary part on the ordinate. Complex representation allows the signals to be plotted simultaneously with reference to their amplitude and phase.

The four crosses 23 in the quadrants of the diagram identify the four angles which are used here for QPSK. In this case, they are the angles 45 degrees, 135 degrees, 225 degrees and 315 degrees. Thus four fixed values are used for the modulation. One of these four values at a time is expected for a received signal. Moreover, the amplitude which corresponds to the distance from the origin of the coordinate intersection to a cross 23 is expected.

In the second quadrant, a circle 24 is shown in addition to cross 23. The distance on the x and y axis between these two elements is shown by 21 as $\Delta x$ and 22 as $\Delta y$. Circle 24 represents a received signal which has an error for the expected signal. This error is indicated by deviations $\Delta x$ and $\Delta y$. If many such received signals are imagined, a cloud forms around such a cross. The larger the cloud, the more the received signals have deviated from the expected signal.

The deviation of the received signal from the expected signal is determined in demodulator 4 by comparing these two signals. The difference between these two signals produces a vector in the constellation diagram, for example, between cross 23 and circle 24 in FIG. 4. Demodulator 4 calculates the length of this vector by customary methods and stores this value. The average value of all determined lengths for a test symbol is a measure of the signal quality. However, a different evaluation of the deviations such as the geometric mean may be used. When the signal quality for test symbols of various carrier signals is compared, these average values are compared.

However, the received signal has not only a phase difference with the expected signal but rather also an amplitude difference. Therefore, both the reference phase and the reference amplitude must be determined via the pilot carrier in the test symbol.

Compared to modulation methods in which more angles as well as amplitude differences are used, QPSK is less susceptible to interference because the acceptable error between the expected value for the phase and the actual value for the phase is greater in the case of QPSK than in these other methods. Consequently, interference will have less influence on the demodulation than in these other modulation methods. Demodulation means examining the received data to determine whether, for example, a zero or a one is present in the case of binary data.

In a coherent modulation method, an absolute phase and amplitude reference is used for demodulation. Since, however, the absolute amplitude and phase are influenced by a large number of influence factors such as, for example, different transmission paths and amplifiers which change, it is useful to determine a reference phase and amplitude. This reference is established with the aid of the pilot carriers. This means that the phase relationship of the pilots is set, for example, at 0 degrees and their amplitude at one. Since the phase and the amplitude of the other subcarriers have a fixed distance for this purpose, namely, the one they already have in the transmitter, a reference is set with the aid of the pilot carriers. Moreover, a coherent modulation method makes a better signal-to-noise ratio possible than an incoherent modulation method. The signal-to-noise ratio is the ratio of signal power to noise power. The higher the signal-to-noise ratio, the better the radio signals are detected.

The test symbols, which are located in the data flow of the digitized, received radio signals, contain no information that is necessary for the presentation, thus no audio information, in particular. In the time in which a test symbol is transmitted, the other carrier signals, on which the same station can possibly be received according to the list also transmitted in the main data flow, are checked as to whether a part of the audio information is lost.

Figure 4:
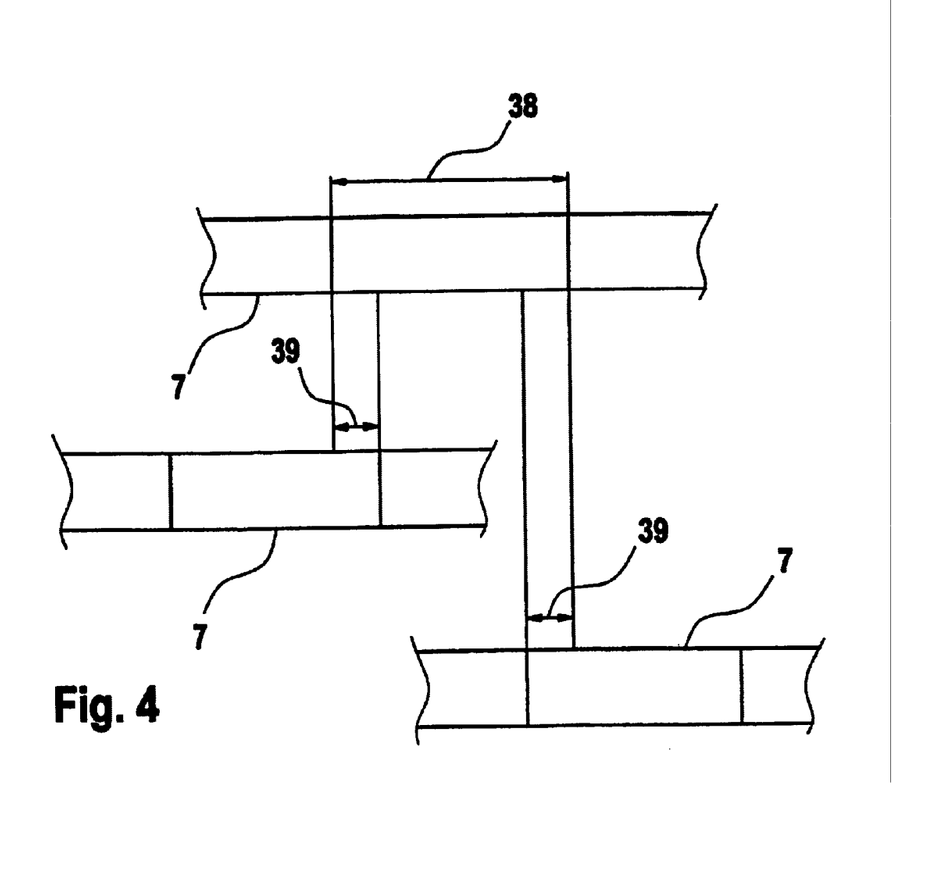
FIG. 4 shows test symbols of a radio station for various frequencies and with various delay times according to the present invention.

Three test symbols 7, which belong to one radio station but which are on different frequencies and arrive at the receiver at different times, are shown in FIG. 4. Test symbols 7 are embedded in the data flow. The length of test symbols 38 is equal; the overlap times 39 are symmetrical in this case.

The upper data flow is on a frequency which is used for the radio station that was selected. The middle and the lower data flows are received on alternative frequencies and represent the borderline cases for the maximum allowable signal delay so that overlap times 39 are shown here at their minimum level.

If the signal quality of the data flows is to be compared, this can occur only during time 38 of the test symbol belonging to the upper data flow since the test symbol contains no useful data such as audio data and the upper data flow is used to receive the radio station. Since the test symbols of the middle and lower data flows only overlap with the test symbol of the upper data flow but do not cover it, times 39 during which the test symbols overlap is sufficiently long that the signal quality can be determined.

The minimally required overlap time 39 is decisively determined by the maximum possible delay time which is based on the transmitter locations for the given radio system. Since the transmitter locations are distributed over the globe and there can thus be very large maximum delay times for specific reception areas, but, on the other hand, the length of test symbol 38 reduces the available channel capacity, a compromise must be made between accepted capacity loss and acceptable signal delay in system dimensioning. Two test symbols of one radio station which are, however, on different frequencies are shifted by no more than the maximum possible delay time if a synchronization between the transmitters is required for a radio station. The minimum overlap time 39, which at least occurs and must be adequate for the determination of signal quality is obtained from this maximum shift.

Based on the time synchronization of the transmitters for a radio station, it follows that the signal pulse for the symbols which is determined for the data flow is the one used for the presentation and also for the symbol pulse on the alternative frequencies of the radio station.

Figure 5:
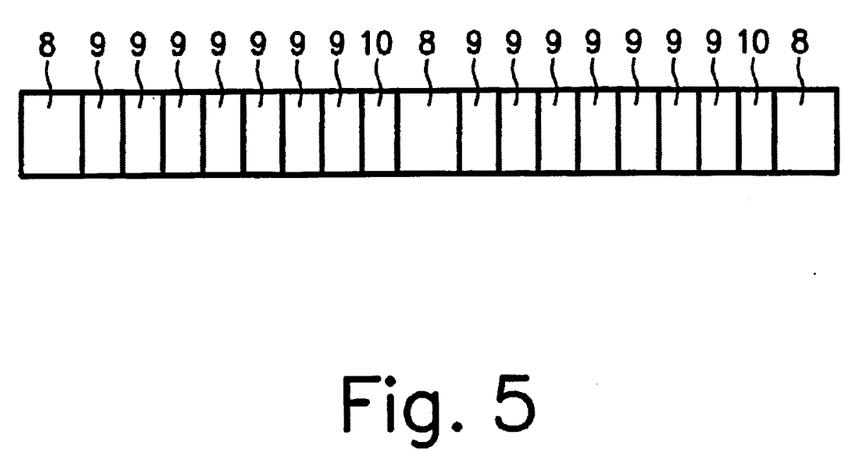
FIG. 5 shows a test symbol with data carriers and pilot carriers as well as sequences for synchronization according to the present invention.

The internal configuration of a test symbol in the frequency range is shown in FIG. 5. On the edges of the test symbol and in the center, a sequence 8 is always provided which is needed for frequency synchronization. In addition, these carriers are also used as pilot carriers for the channel estimate.

The additional carriers of the test symbol are useful data 9 and pilots 10. The identification number of the radio station is encoded in the useful data. The identification number is used to check whether the present data flow on this frequency belongs to the radio station selected by the user. This step is carried out concurrent with the determination of signal quality. It is ensured that it is possible to switch to only those carrier signals that contain the radio station selected by the user.

However, before the useful data can be decoded, the received scan values must be corrected due to the frequency shift that was experienced. A favorable byproduct of the result of the time correlation is that the fine frequency error of the signal in the range +/−½ subcarrier distance can be determined precisely so that the determination of the integer multiples of a carrier distance is left over as a frequency offset. This can be achieved with special sequences having favorable correlation characteristics such as, for example, the CAZAC sequences used in DAB, on groups of pilot carriers (data 8 in FIG. 5).

In addition to the support of the coherent demodulation of the QPSK data, the skillful arrangement of the pilot carriers also offers, in the case of a frequency change, the possibility of delivering a very good channel estimate for the subsequent coherent demodulation of the modulated carriers in the data flow. Thus the long synchronization, which is normally the case, is eliminated and an uninterrupted switch made possible.

Pilots 10 which occur at fixed distances in the test symbol, in each eighth field in this case, are used for the channel estimate and, as mentioned above, the determination of the reference phase and reference amplitude.

The frequency at which the test symbols occur in the data flow depends on the loss of transmission capacity determined by the test symbols. The length of the test symbols and the repeat frequency of the test symbols have an influence on this.

If the useful symbol length $T_{TU}$ is 15 ms, it is determined that the minimally required overlap between test symbols of a radio station on different frequencies is $T_{TU}+T_{PLL}+T_{KORR}$ (24 ms) This minimum overlap time includes a symbol length $T_{TU}$ (15 ms) which is useful in determining the signal quality. Added to this is the transient time of the filters and other elements of the receive section, which is $T_{PLL}$, if the receive section is set to a different frequency. This transient time is assumed to be 6 ms in one exemplary embodiment according to the present invention. Added to this is the necessary length for the correlation interval $T_{KORR}$ (3 ms). The width of test symbol $T_{TGES}$ (42 ms) is made up of symbol length $T_{TU}$ (15 ms), a maximum delay time $T_{VERZ}$ (18 ms), which results from the aforementioned compromise, transient time $T_{PLL}$ (6 ms) and the time to perform the correlation $T_{KORR}$ (3 ms). If this 42 ms test symbol is repeated every 2 seconds, there results a channel loss corresponding to 2.1%. A maximum loss of 5% is regarded as acceptable.

The length of the test symbol also depends on whether additional data is encoded in the test symbols. The test symbols in the data flow can be recognized by the length of the test symbols which varies from other OFDM symbols. In addition, there is the possibility that carrier signals on alternative frequencies that contain the same radio station are recognized by overlap of the test symbols. This is possible with a high degree of probability because the data flows of different radio stations of different broadcasting stations are, as expected, not synchronized so that an overlap of test symbols of different radio stations is very unlikely to occur.

Figure 6:
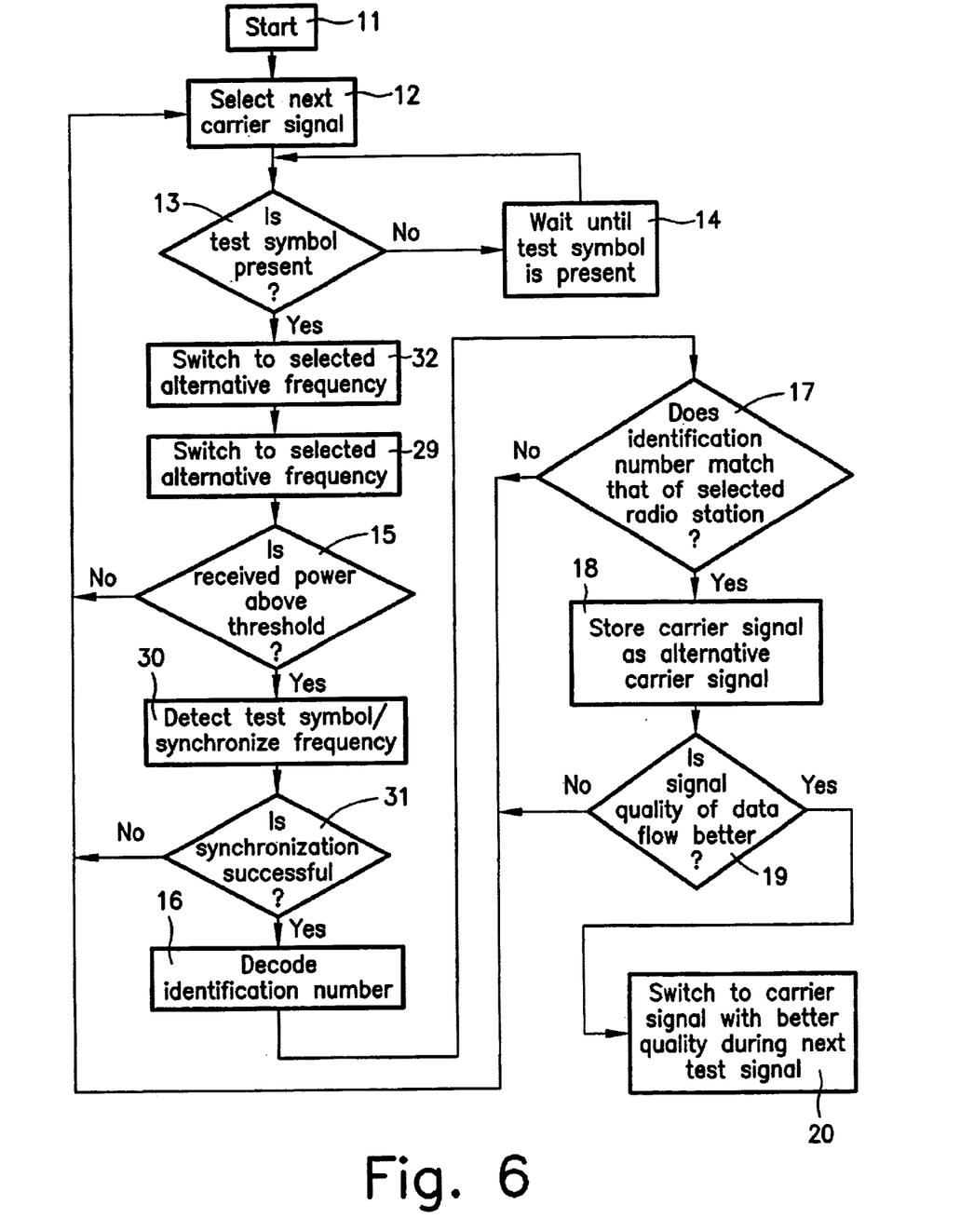
FIG. 6 shows a flow chart which describes the identification of the alternative carrier signals according to the present invention.

In FIG. 6, a flow chart shows the processing steps in processor 3 when determining the signal quality and the possible switchover to a different carrier signal.

This processing, which takes place in processor 3, is started in method step 11. In method step 12, the next carrier signal for the radio station is selected from the received list of carrier signals that correspond to different frequencies. In method step 13 a check is made to determine whether a test symbol is present at the current time. If this is not the case, the system waits in method step 14 until a test symbol is present. If a test symbol is recognized, a switch is made to the selected alternative frequency in method step 29. In method step 15, a check is made to determine whether the received power is above a threshold stored in the receiver. In this manner, radio signals received with a very weak signal level are excluded.

If the signal level of this carrier signal is below the threshold, the next carrier signal is selected in method step 12. If the signal level of this test symbol is above the threshold, an attempt is made in method step 30 to detect a test symbol and to bring about frequency synchronization. In method step 31, a check is made to determine whether synchronization was successful. If it was not, the system returns to method step 12. If it was successful, the identification number is decoded from the test symbol in method step 16. If the identification number of the data flow of this carrier signal matches the radio station that the user selected, this carrier signal is stored as an alternative carrier signal in method step 18. If the identification number does not match that of the selected radio station, the next carrier signal from the list is selected.

In method step 19, a check is made to determine whether the signal quality of the data flow belonging to the carrier signal stored in method step 18 is better than the signal quality of the data flow which is being used at the moment to present the radio station. If this is not the case, the next carrier signal is taken from the list in method step 12. If the signal quality is better, then a switch is made to this carrier signal during the next test symbol.

Figure 7:
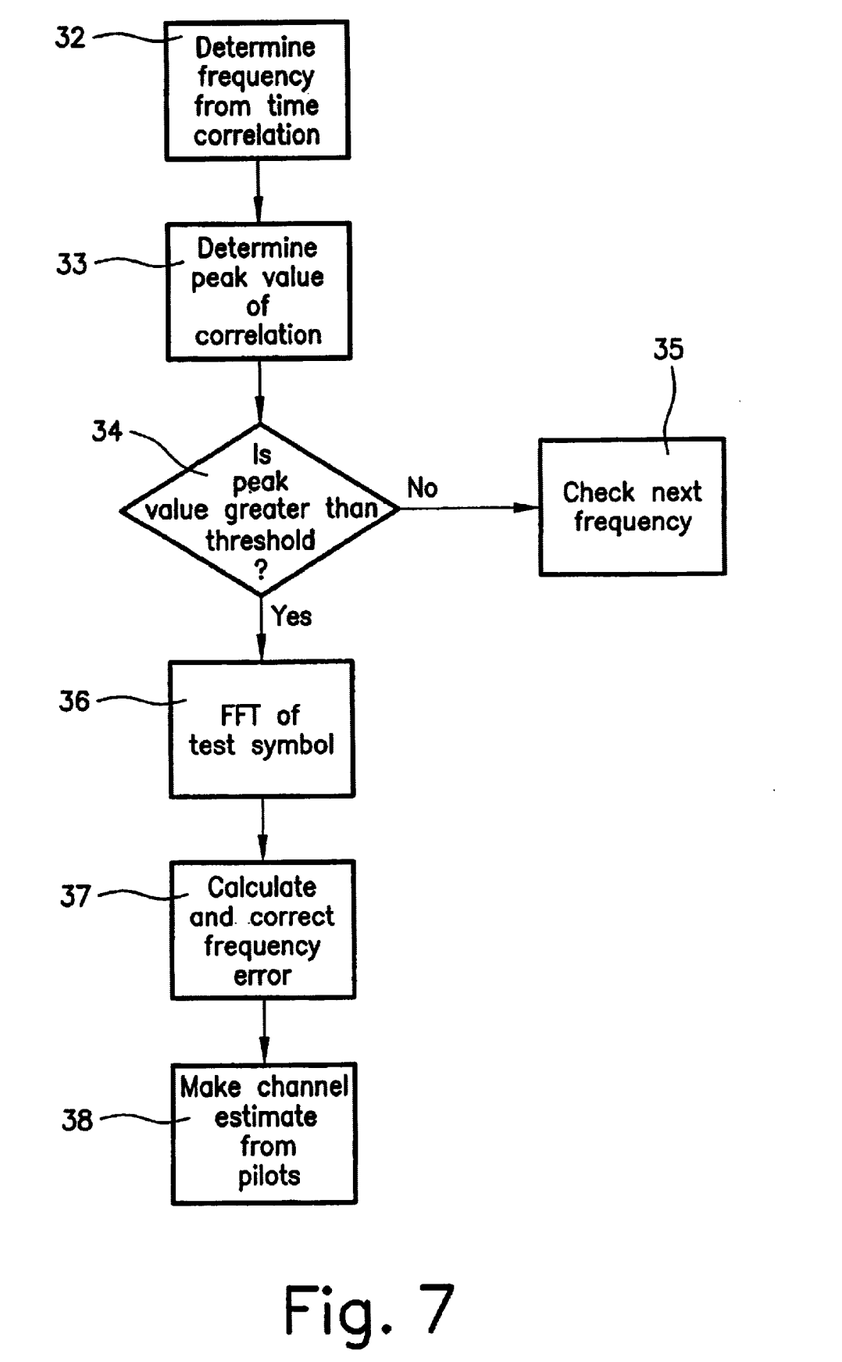
FIG. 7 shows a flow chart which describes the frequency synchronization according to the present invention.

FIG. 7 shows a flow chart for the frequency synchronization which is mentioned in FIG. 6 in method steps 30 and 31 In method step 32, the frequency is determined from the time correlation as described above. In method step 33, the peak value of the correlation is determined. In method step 34, a check is made to determine whether the peak value of the correlation is higher than a threshold value stored in the receiver. If the peak value is below the threshold value, the next frequency is checked in method step 35. The next move is to method step 12 in FIG. 6. If the peak value of the correlation is above the threshold value, an FFT of the test symbol is carried out in method step 36 so that the test symbol is present in the frequency range. In method step 37, the frequency error is calculated and corrected. In method step 38, a channel estimate is made from the pilots. After that, the method is continued with method step 16 from FIG. 6.

What is claimed is:

1. A method for transmitting and receiving radio signals by orthogonal frequency division multiplex (OFDM), comprising:

transmitting a radio station on various carrier signals;

selecting, via a user, a radio station;

providing, via radio signals, an identification number for a particular radio station, wherein the radio signals include test symbols with pilot carriers, synchronization signals and useful data signals;

determining continuously a signal quality of the selected radio station as a function of carrier signals on which the radio station is received;

determining the identification number and the signal quality for the radio station from the radio signals; and using for reception of the selected radio station a carrier signal resulting in a best signal quality;

replacing an already presented radio station which is received on a first carrier signal with the same radio station which is received on a second carrier signal without interrupting a presentation by the same radio station if the signal quality of the radio station on the second carrier signal is better than the signal quality of the radio station on the first carrier signal;

indicating all carrier signals on which the same radio station is transmitted via data contained in the radio signals;

preserving a symbol pulse when a switch is made to the carrier signal via which the same radio station is received as the radio station selected by the user; and determining the signal quality of the radio station received on the received carrier signals via the test symbols.

2. The method according to claim 1, further comprising the step of:

recognizing the test symbol by a protective interval which is different from other symbols.

3. The method according to claim 1, further comprising the step of:

making a channel estimate via the pilot carriers.

4. The method according to claim 2, further comprising the step of:

modulating and demodulating the test symbols with a coherent digital modulation method.

5. The method according to claim 3, further comprising the step of:

determining a reference phase and a reference amplitude via the pilot carriers for a coherent demodulation.

6. The method according to claim 4, further comprising the step of:

determining the identification number for the radio station selected by the user via the test symbols.

7. The method according to claim 4, further comprising the step of:

identifying, via the length of a test symbol, a data flow of the particular radio station.

8. A receiver for receiving radio signals in orthogonal frequency division multiplex (OFDM), comprising:

an antenna receiving OFDM radio-frequency signals;

a receive section coupled to the antenna, the receive section receiving, via the antenna, a radio station from multiple transmitters on different carrier signals and different carrier frequencies;

at least one processor coupled to the receive section, the at least one processor continuously determining signal quality of a selected radio station over the different carrier signals, the at least one processor determining an identification number and the signal quality of the selected radio station from the received radio signals, the at least one processor selecting a particular carrier signal which has the selected radio station with a best signal quality, wherein the received radio signals include symbols, test symbols, pilot signals and useful data signals; and a presentation unit coupled to the at least one processor, the presentation unit presenting the selected radio station;

wherein the receiver replaces a radio station already presented, which the receiver receives on a first carrier signal, with the same radio station, which the receiver receives on a second carrier signal, if the receiver determines a better signal quality for the second carrier signal;

wherein the receiver recognizes a start of the received symbols and test symbols, the pilot signals and useful data signals via correlation in protective intervals and symbol ends.

9. The receiver according to claim 8, wherein the receiver determines the identification number that identifies the radio station from the test symbols.

10. The receiver according to claim 9, wherein the receiver determines a reference phase and a reference amplitude for coherent demodulation via the pilots.

11. The receiver according to claim 10, wherein the receiver determines the signal quality via a deviation of an amplitude and a phase of the received radio signal with respect to an expected amplitude and an expected phase, and wherein the receiver evaluates all deviations for a test symbol and uses the evaluation as a measure of the signal quality.

12. The receiver according to claim 11, wherein the receiver distinguishes the test symbols from other symbols by different symbol lengths.

13. The receiver according to claim 11, wherein the receiver identifies a data flow of a radio station in that a length of a test symbol is different from that of other symbols.

14. The receiver according to claim 12, wherein the receiver stores state information in the receive section for the presented radio station when the receiver determines the signal quality of this radio station on other frequencies during the test symbols.

15. The receiver according to claim 14, wherein the state information includes at least one of frequency settings and amplification settings.

16. The receiver according to claim 13, wherein the receiver stores state information in the receive section for a successfully checked alternative frequency so that the receive section can start with non-random start values for settings of frequency section in the case of at least one of a later check and a continuous change.

17. The receiver according to claim 16, wherein the state information includes at least one of frequency settings, amplification setting and skew in relation to the data flow.

* * * * *